United States Patent

Askinazi et al.

[11] Patent Number: 5,993,981
[45] Date of Patent: Nov. 30, 1999

[54] BROADBAND PROTECTIVE OPTICAL WINDOW COATING

[75] Inventors: Joel Askinazi, Trumbull, Conn.; Authi A. Narayanan, Thousand Oaks, Calif.; Hoa T. Bui, Trumbull, Conn.; Joseph A. Vigil, Oxnard; John J. Vajo, Calabasas, both of Calif.

[73] Assignee: Raytheon Company, Lexington, Mass.

[21] Appl. No.: 08/844,715

[22] Filed: Apr. 18, 1997

[51] Int. Cl.[6] .................................. B32B 9/00; G02B 1/10
[52] U.S. Cl. ...................... 428/699; 428/432; 428/469; 428/704; 359/580; 106/286.2; 106/286.5
[58] Field of Search ....................... 428/688, 689, 428/697, 699, 426, 432, 433, 457, 469, 472, 585, 704; 359/350, 359; 106/286.2, 286.5, 287.29

[56] References Cited

U.S. PATENT DOCUMENTS

| | | | |
|---|---|---|---|
| 3,781,090 | 12/1973 | Sumita | 350/164 |
| 4,789,421 | 12/1988 | Umeno et al. | 156/610 |
| 5,075,743 | 12/1991 | Behfar-Rad | 357/17 |
| 5,262,196 | 11/1993 | Colton | 427/162 |
| 5,331,656 | 7/1994 | Tanaka | 372/45 |
| 5,363,390 | 11/1994 | Yang et al. | 372/22 |
| 5,521,759 | 5/1996 | Dobrowolski et al. | 359/585 |
| 5,712,724 | 1/1998 | Kloeck et al. | 359/350 |
| 5,753,379 | 5/1998 | Gibson et al. | 428/699 |
| 5,847,876 | 12/1998 | Ferrante et al. | 359/581 |

OTHER PUBLICATIONS

Desmond R. Gibson et al., "Ultradurable phosphide–based antireflection coatings for sand and rain erosion protection" Optical Engineering, vol. 33, No. 3, pp. 957–966, 1994.

S.W. Choi et al., "Remote plasma enhanced chemical vapor deposition of GaP in situ generations phophine precursors", Vacuum Science & Technology B, vol. 10, No. 3, pp. 1070–1073, 1992.

K. L. Lewis et al., "Phosphide based materials as hard optical coatings— a review", Society of Photo–Optical Engineering, vol. 1275, pp. 46–51, 1990.

*Primary Examiner*—Timothy Speer
*Assistant Examiner*—Stephen Stein
*Attorney, Agent, or Firm*—William C. Schubert; Glenn H. Lenzen, Jr.

[57] ABSTRACT

The present invention provides a broadband transmitting protective coating (10) including an AlGaP protective layer (14) deposited on an optical substrate (12) and an anti-reflection film (16) deposited on the AlGaP protective layer (14). The coating (10) is suitable for use with typical infrared and broadband optical substrate materials such as germanium or multi-spectral ZnS. In the case of a germanium substrate (12), the anti-reflection film (16), (16a) preferably consists of a single layer of hard carbon or alternating layers of hard carbon and silicon. In the case of a multi-spectral ZnS substrate (12a), the anti-reflection film (16b) preferably consists of layered $Al_2O_3/TaO_5/LaF_3/MgF_2$. The protective coating (10) is preferably deposited on the optical substrate (12) by a metal organic chemical vapor deposition process wherein an initial layer of AlP is nucleated on the substrate (12) at a temperature of approximately 400° C. The temperature of the substrate (12) is then raised to approximately 600° C. and a layer of AlGaP (14) is grown on the substrate (12) to a preselected thickness. The AlGaP coated optical substrate (12) is then polished to a desired smoothness. The anti-reflection film (16) is then deposited on the AlGaP layer (14) using an RF chemical vapor deposition process or a thermal evaporation process.

18 Claims, 2 Drawing Sheets

BROADBAND PROTECTIVE OPTICAL WINDOW COATING

BACKGROUND OF THE INVENTION

1. Technical Field

The present invention generally relates to protective coatings for optical window substrates and, more particularly, to a protective and anti-reflection coating for optical windows employed in airborne and ground based tactical and surveillance sensors.

2. Discussion

Optical windows employed in airborne and ground based tactical and surveillance sensors are often exposed to hostile environments where they collide with rain and sand. The degree to which the window can withstand the impact of the rain and sand directly influences the operational envelope available for the sensor. Additionally, failed windows must be replaced which results in sensor idle time and maintenance expense.

Conventional optical windows begin to sustain impact damage at aircraft speeds well below Mach 1 and fail prematurely due to high speed rain/sand particle impact. Prior art anti-reflection coatings provide minimal resistance against impact damage. The impact resistance, or knoop hardness, of these coatings does not allow the windows to operate safely at high rain/sand impact speeds without significantly degrading optical performance.

Furthermore, boron phosphide and gallium phosphide coatings which do provide good impact resistance have a relatively narrow band gap and therefore provide only marginal optical transmittance over a relatively narrow optical bandwidth. For example, boron phosphide has an optical absorption property which makes it suitable for operation primarily in the long wave infra-red (LWIR) range. Therefore, these coatings are not suitable with the newer class of broadband, common aperture optical sensors which employ broadband optical window materials such as multi-spectral zinc sulfide and operate in bandwidths from the television (TV) to mid-wave infra-red (MWIR) or from the TV to LWIR.

The drawbacks of conventional coatings results in the need to frequently refinish and/or replace optical windows which causes high window life cycle costs. Moreover, the operational envelope for sensor systems employing prior art coatings is restricted by their relatively poor optical performance at high rain/sand impact speeds.

Accordingly, it is desirable to provide a combined protective and anti-reflection coating having excellent broadband transmittance and yielding significant impact protection for the optical window from high speed rain/sand particles.

SUMMARY OF THE INVENTION

The above and other objects are provided by a broadband transmitting protective coating including an aluminum gallium phosphide (AlGaP) protective layer deposited on an optical substrate and an anti-reflection film deposited on the AlGaP protective layer. The coating is suitable for use with typical infrared and broadband optical substrate materials such as germanium (Ge), multi-spectral zinc sulfide (ZnS), zinc sulfide (ZnS) or zinc selenide (ZnSe). In the case of a germanium substrate, the anti-reflection film preferably consists of a single layer of hard carbon or alternating layers of hard carbon and silicon. In the case of a multi-spectral ZnS, ZnS or ZnSe substrates, the anti-reflection film preferably consists of layered aluminum oxide/tantalum oxide/lanthanum fluoride/magnesium fluoride ($Al_2O_3$/$TaO_5$/$LaF_3$/$MgF_2$)

The protective coating is preferably deposited on the optical substrate by a metal organic chemical vapor deposition process wherein an initial thin layer of aluminum phosphide (AlP) is nucleated on the substrate at a temperature of approximately 400° C. for ZnS, ZnSe, or Ge substrates so as to form a two-dimensional dimensional thin film covering the entire surface area. The temperature of the substrate is then raised (if necessary) to approximately 600° C. and a layer of AlGaP is grown on the substrate to a preselected thickness. The AlGaP coated optical substrate is then polished to a desired smoothness. The anti-reflection film is then deposited on the AlGaP layer using a radio frequency chemical vapor deposition (RFCVD) process or a thermal evaporation process for multi-spectral ZnS substrates or Ge substrates respectively.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DESCRIPTION OF THE PREFERRED EMBODIMENTS

The present invention is directed toward a durable, broadband, thick and hard impact protective coating including an anti-reflection film for optical window substrates. In accordance with the present invention, the combined protective/anti-reflection coating provides excellent broadband transmittance and also provides significant impact protection for the optical substrate from high speed rain and/or sand particles. The coating made in accordance with the present invention is harder by a factor of five or more than that of bare substrate materials.

Figure 1:
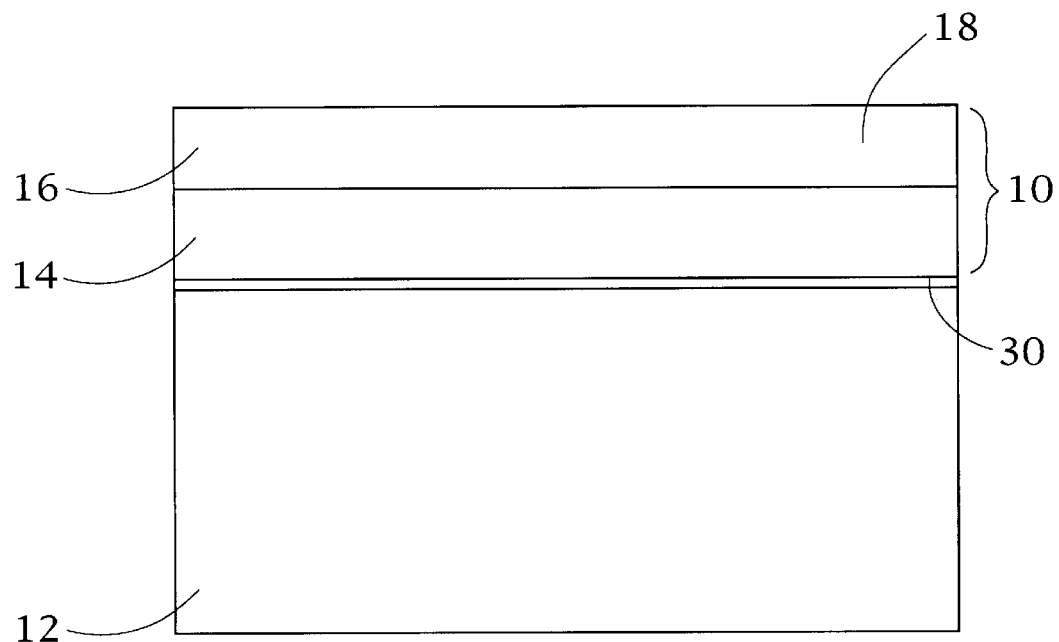
FIG. 1 is a schematic view in cross-section illustrating a first embodiment of the present invention.

Turning now to the figures, a first embodiment of the protective/anti-reflection coating is illustrated in FIG. 1 in cross-section and is indicated generally at 10. The coating 10 is deposited on a substrate 12 suitable for use in optical sensor window applications, in this case, consisting of germanium. The coating 10 of the first embodiment includes a protective layer 14, consisting of AlGaP, and an anti-reflection film 16, consisting of a single layer of hard carbon 18.

The hard carbon anti-reflection film 16 applied over the AlGaP protective layer 14 enhances the optical transmittance of the AlGaP coated germanium substrate 12 over the MWIR and/or LWIR bands. Additionally, the AlGaP protective layer 14 enhances the impact resistance of the hard carbon anti-reflection film 16 to rain and/or sand particles impinging thereon. As such, the substrate 12 is capable of withstanding high speed rain/sand impact environments not previously feasible without any significant optical transmittance losses.

Preferably, the AlGaP protective layer 14 is deposited on the substrate 12 by a metal organic chemical vapor deposition (MOCVD) process. As described in greater detail below, the process is optimized by nucleating an AlP film on the substrate and then growing a relatively thick layer of AlGaP thereon. A thickness of 22 μm has been found optimal for combined impact protection and optical transmittance. A post deposition polishing process is also employed to smooth the surface of the thick AlGaP protective layer 14 to reduce optical scatter from its outer surface. After polishing, the hard carbon anti-reflection film 16 is deposited onto the AlGaP protective layer 14 with a radio frequency chemical vapor deposition (RFCVD) process.

Figure 2:
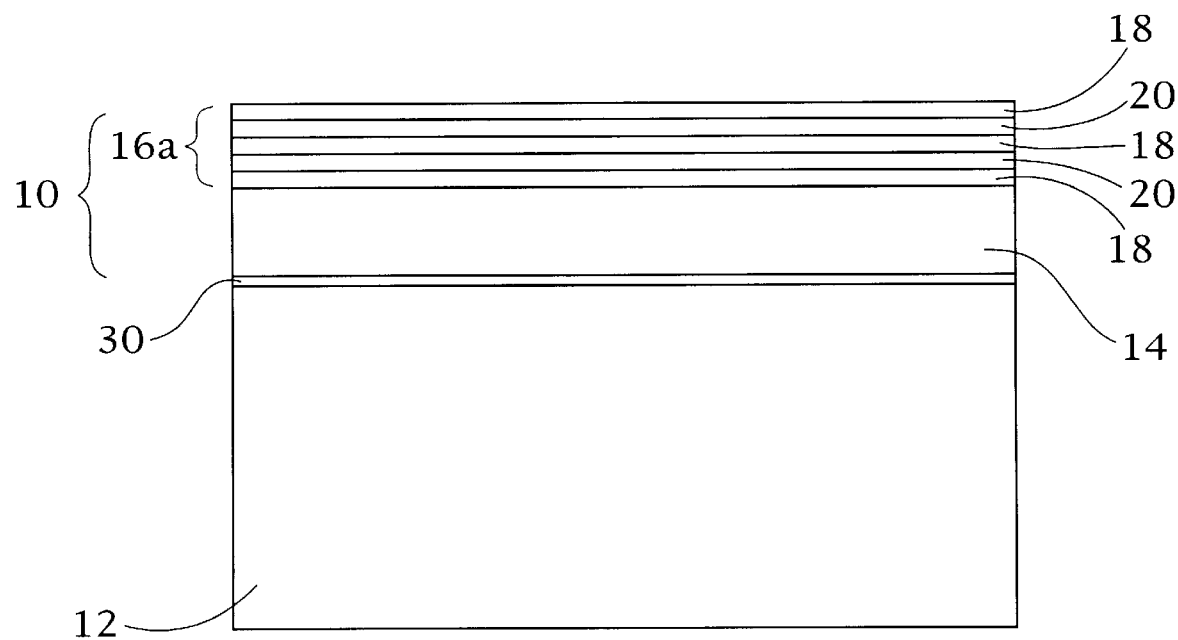
FIG. 2 is a schematic view in cross-section illustrating a second embodiment of the present invention.

Turning now to FIG. 2, an alternate embodiment of the present invention is illustrated in cross-section. In this embodiment, the coating 10 includes an anti-reflection film 16a consisting of alternating layers of hard carbon 18 and silicon 20. This anti-reflection film will be referred to hereinafter as a multi-layer hard carbon anti-reflection film. Preferably, the multi-layer hard carbon anti-reflection film 16a is deposited on the AlGaP protective layer 14 by an RFCVD process. It should be noted that single layer hard carbon presently appears more attractive than multi-layer hard carbon for use as an anti-reflection film on germanium substrates.

Figure 3:
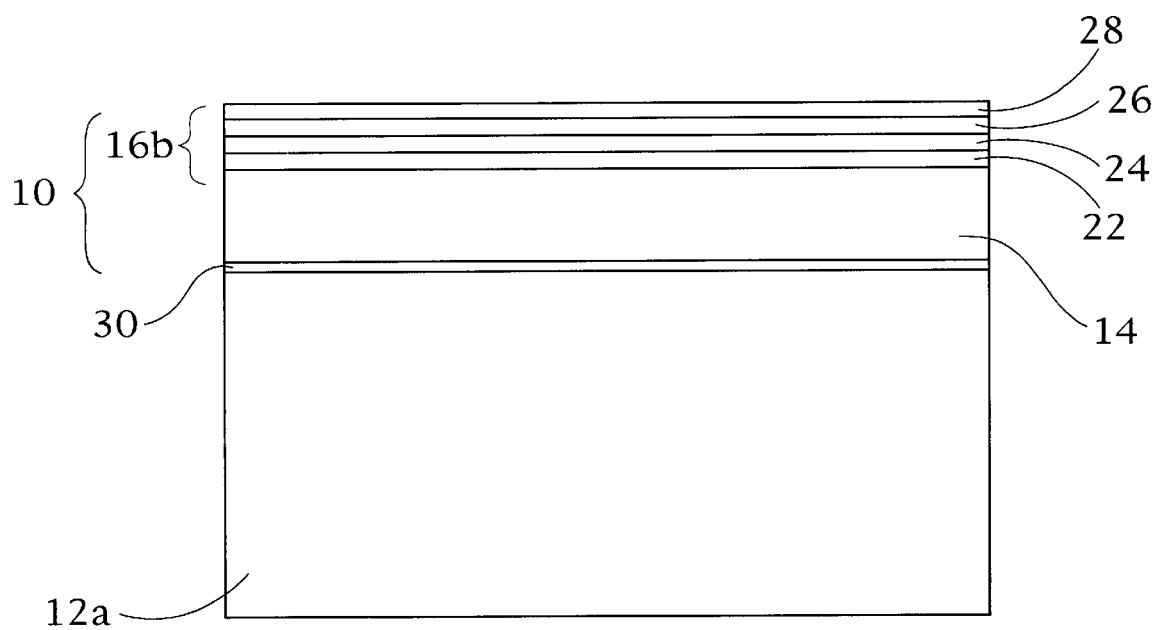
FIG. 3 is a schematic view in cross-section illustrating a third embodiment of the present invention.

A third embodiment of the present invention is depicted in FIG. 3. In this embodiment, the optical window substrate 12a consists of multi-spectral zinc sulfide ZnS or zinc selenide. As with the first two embodiments, the protective layer 14 consists of AlGaP. However, the anti-reflection film 16b consists of layered $Al_2O_3$ 22, $TaO_5$ 24, $LaF_3$ 26, and $MgF_2$ 28. The anti-reflection film 16b is deposited on the AlGaP protective layer 14 by a thermal evaporation process. The anti-reflection film 16b applied over the AlGaP protective layer 14 enhances the optical transmittance of the AlGaP coated ZnS or ZnSe substrate 12a over the 0.75 to 12 micrometer band. Additionally, the AlGaP protective layer 14 enhances the impact resistance of the anti-reflection film 16b applied thereon.

An AlGaP film thickness of approximately 22 μm is presently preferred for impact protection and optical transmittance. Thinner films result in greater optical transmittance loss due to impact damage. Thicker films can produce greater transmittance loss from the buildup of residual stress levels within the film. However, thicker films may be warranted for optical windows operating only in the MWIR or LWIR bands where less optical transmittance thickness sensitivity occurs.

The preferred process for depositing the AlGaP protective layer 14 on the substrates 12 and 12a will now be described in greater detail. Due to the large lattice mismatch between the substrate materials and the AlGaP layer 14, a nucleation process is employed to provide a uniform and infrared transparent coating and to enhance the adherence to the substrate 12, 12a. The AlGaP protective layer 14 can also be applied to substrates mounted in susceptors used in an MOCVD process to suppress outgassing during the coating process.

With either substrate material, i.e., germanium, multi-spectral zinc sulfide, zinc sulfide or zinc selenide, growth of the AlGaP protective layer 14 at temperatures equal to or above 750° C. results in the formation of crystallites of relatively large sizes (>8 micrometers). Accordingly, the resulting film is undesirably porous. Furthermore, post growth polishing results in a pitted surface morphology which is to be avoided. Therefore, it is preferable to grow an initial layer 30 (See FIGS. 1–3) of AlP of about 1000 Å on the substrate at a relatively low growth temperature, such as 400° C. for ZnS, ZnSe, or Ge. Thereafter, the growth temperature is raised, if necessary, to 600° C. and deposition is continued with AlGaP. This technique provides a uniform, two dimensional film for nucleation and subsequent two dimensional AlGaP growth.

It has also been found that the optical transmission of germanium windows with an AlGaP protective layer directly grown thereon at temperatures greater than 700° C., that is, without the initial low temperature nucleating film, is very poor (less than 20%) and transmission at long wavelengths, such as 5–10 micrometers, is almost zero. This is due to the presence of germanium in the AlGaP layer on the order of >1E+16 $cm^{-3}$. The transmission loss is due to free carrier absorption caused by auto doping. This is solved by providing the low temperature nucleating film and utilizing a growth temperature of about 600° C.

Pure hydrogen has been used as a carrier gas during the growth of AlGaP on germanium substrates without any deleterious effects. However, hydrogen has been found to react with the surface of ZnS substrates thereby changing the surface stoichiometry which affects optical transmission. Therefore, it is presently preferred to use other inert gasses such as nitrogen or argon as a carrier gas for growing AlGaP layers on ZnS and ZnSe substrates.

An exemplary process for depositing the protective/anti-reflection coating 10 on each substrate will now be described in greater detail. With respect to germanium substrates, the substrate is initially polished using conventional chemical and mechanical methods and then degreased. Subsequently, the germanium substrate is etched with $H_2O/H_2O_2/HCl$ at a ratio of 4:1:1 for approximately three minutes. The germanium substrate is then carefully repolished to remove any previous polishing damage followed by re-etching with $H_2O/H_2O_2/HCl$ at a ratio of 10:1:1 for approximately one minute. The substrate is then rinsed in deionized water (for about fifteen minutes) and blown dry using nitrogen.

After loading the germanium substrate into an MOCVD reactor, it is heat cleaned in hydrogen at 750° C. for approximately five minutes to desorb surface oxides. The germanium substrate is then cooled to 400° C. and nucleated with AlP to approximately 1,000 Å. The temperature is then raised to 600° C. and the deposition is then continued with AlGaP which is preferably grown to about 28 μm. The coated substrate is then cooled to room temperature and removed from the MOCVD reactor. The AlGaP layer is then polished to mirror smoothness with a thickness of approximately 22 μm. Thereafter, the single or multi-layer hard carbon anti-reflection film is deposited on the AlGaP layer by an RFCVD process.

With respect to ZnS and ZnSe substrates, the following process is preferred. The substrate is initially polished using chemical and mechanical methods and then degreased. Subsequently, the substrate is etched with 0.05% bromine in ethylene glycol for approximately three minutes followed by rinsing with Ethylene Glycol and then with methanol for about one minute each. The substrate is then dipped in warm isopropyl alcohol for a minute followed by dipping in boiling isopropyl alcohol for one minute with slow removal to enhance evaporation. The substrate is then repolished to remove any previous polishing damage followed by re-etching in 0.05% bromine in ethylene glycol for approximately thirty seconds. The substrate is then rinsed again following the above sequence.

After loading the substrate into an MOCVD reactor, it is heat cleaned in argon at 400° C. for approximately five minutes to desorb surface oxides. The substrate is then nucleated with AlP. The temperature of the substrate is then raised to 600° C. and deposition is continued with AlGaP which is grown to approximately 28 $\mu$m. The substrate is then polished to mirror smoothness with a thickness of approximately 22 $\mu$m. Thereafter, an anti-reflection film of $Al_2O_3/TaO_5/LaF_3/MgF_2$ is deposited on the AlGaP layer by a thermal evaporation process.

In operation, the hard AlGaP protective layer provides rain/sand impact protection for sensor windows without significantly sacrificing the broad band optical transmittance properties of the optical substrate. The hard coating permits the optical substrate to survive severe, high speed, rain/sand impact environments with minimal, if any, degradation in optical transmittance and minimal, if any, substrate impact damage. The coating permits the sensor window to operate for longer periods in rain/sand environments than currently feasible. Accordingly, window life cycle costs through the need for less frequent replacements is reduced. In addition, the coated windows are able to operate safely at higher rain/sand impact speeds than currently feasible without significant degradation of optical performance, thereby expanding the operational envelope of new sensor systems containing the coated window.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A protective coating having broadband transmittance for an optical substrate comprising:

an AlP layer deposited on said substrate;

an AlGaP layer deposited on said AlP layer; and an anti-reflection film layer deposited on said AlGaP layer.

2. The protective coating of claim 1 wherein said AlGaP layer has a thickness of approximately 10–40 micrometers.

3. The protective coating of claim 1 wherein said AlGaP layer has a thickness of approximately 20–30 micrometers.

4. The protective coating of claim 1 wherein said AlGaP layer has a thickness of approximately 22 micrometers.

5. The protective coating of claim 1 wherein said anti-reflection film comprises one of the group consisting of a single layer of hard carbon, alternating layers of hard carbon and silicon, and layered $Al_2O_3/TaO_5/LaF_3/MgF_2$.

6. The protective coating of claim 1 wherein said optical substrate comprises one selected from the group consisting of germanium, zinc sulfide, and zinc selenide.

7. The protective coating of claim 1 wherein said AlGaP layer is deposited by a metal organic chemical vapor deposition process.

8. The protective coating of claim 1 wherein said anti-reflection film is deposited on said AlGaP layer by a process selected from the group consisting of radio frequency chemical vapor deposition and thermal evaporation.

9. An optical window for use in airborne and ground based tactical and surveillance sensors suitable for withstanding high speed rain and sand impact with improved broadband transmittance, said optical window comprising:

a germanium substrate;

an AlP nucleating layer deposited on said germanium substrate;

an AlGaP protective layer deposited on said AlP nucleating layer to a preselected thickness; and an anti-reflection film deposited on said AlGaP protective layer.

10. The optical window of claim 9 wherein said anti-reflection film further comprises one selected from the group consisting of a single layer of hard carbon, and alternating layers of hard carbon and silicon.

11. The optical window of claim 9 wherein said preselected thickness of said AlGaP protective layer is approximately 20–25 micrometers.

12. The optical window of claim 9 wherein said AlGaP protective layer is deposited on said AlP nucleating layer by a metal organic chemical vapor deposition process.

13. The optical window of claim 9 wherein said anti-reflection film is deposited on said AlGaP protective layer by a radio frequency chemical vapor deposition process.

14. An optical window for use in airborne and ground based tactical and surveillance sensors suitable for withstanding high speed rain and sand impact with improved broadband transmittance, said optical window comprising:

a multi-spectral zinc sulfide, zinc sulfide or zinc selenoid substrate;

an AlP nucleating layer deposited on said substrate;

an AlGaP protective layer deposited on said AlP nucleating layer to a pre-selected thickness; and an anti-reflection film deposited on said AlGaP protective layer.

15. The optical window of claim 14 wherein said anti-reflection film further comprises layered $Al_2O_3/TaO_5/LaF_3/MgF_2$.

16. The optical window of claim 14 wherein said preselected thickness of said AlGaP protective layer is approximately 20–25 micrometers.

17. The optical window of claim 14 wherein said AlGaP protective layer is deposited on said AlP nucleating layer by a metal organic chemical vapor deposition.

18. The optical window of claim 14 wherein said anti-reflection film is deposited on said AlGaP protective layer by a thermal evaporation process.

\* \* \* \* \*